March 13, 1945. E. B. BIRD 2,371,375
QUICK-DETACHABLE FAUCET CONNECTION
Filed March 7, 1944
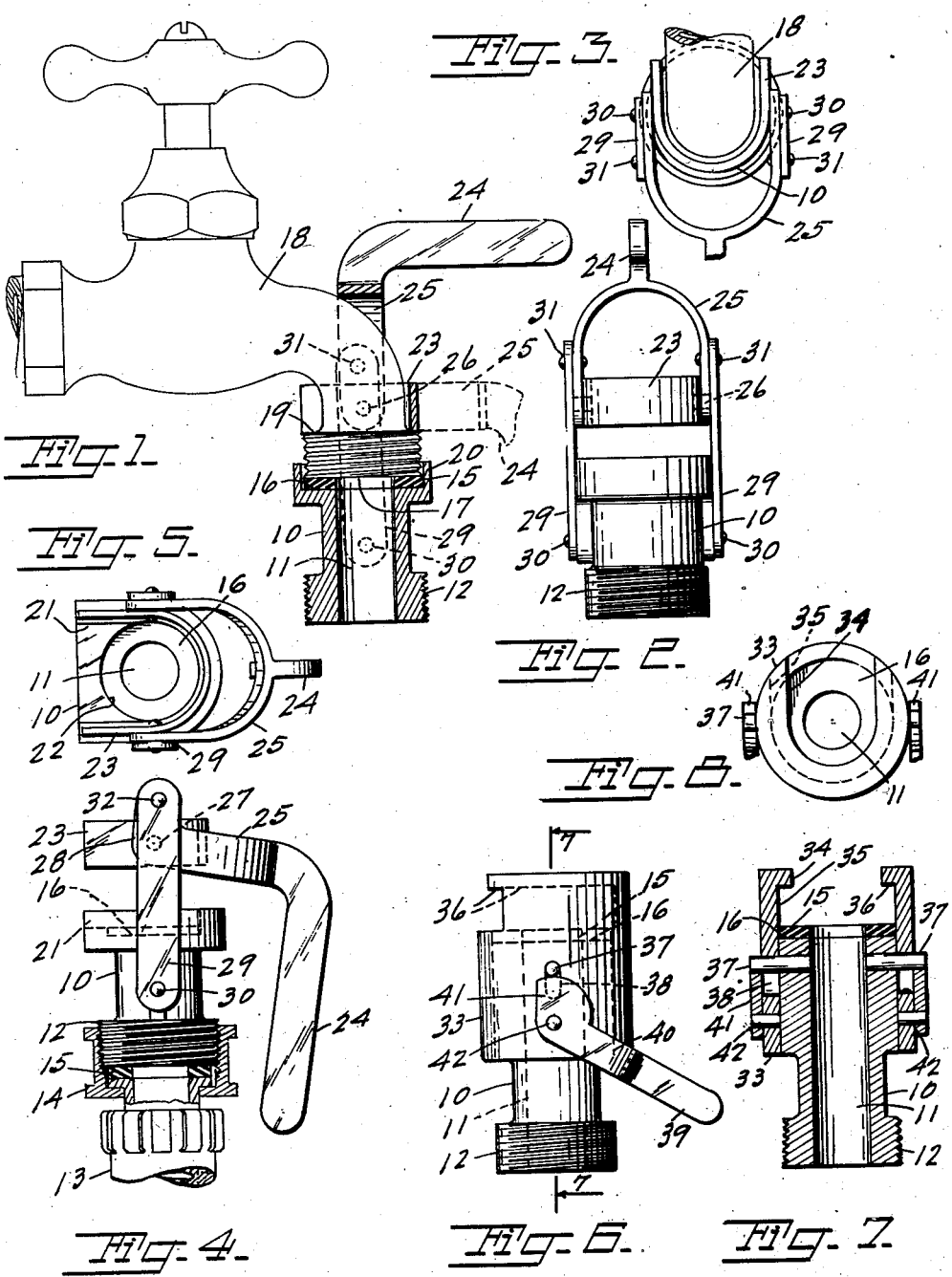
Inventor
Emerson B. Bird
By Philip A. Friedell
Attorney Patented Mar. 13, 1945

2,371,375

UNITED STATES PATENT OFFICE 2,371,375

QUICK-DETACHABLE FAUCET CONNECTION

Emerson B. Bird, Richmond, Calif.

Application March 7, 1944, Serial No. 525,411

6 Claims. (Cl. 285—181)

This invention, a quick-detachable faucet connection, is designed specifically for easy and quick attachment of a garden hose to the conventional outdoor or garden faucet, and for just as easy and quick detachment, and is an attachment to be coupled to the garden hose through the conventional hose coupling to form a permanent part of the hose throughout the life of the hose.

As is well known, attachment of the conventional hose coupling to a garden faucet is a rather slow and tedious operation, and particularly so if the threads either in the coupling or on the faucet are corroded or marred, and under which conditions it is usually impossible to produce a leak-proof joint; in fact, production of a tight joint is quite difficult even with new faucets and couplings. In making such connections the hands of the person are often bruised and sometimes even scratched or cut, though still finding the connection leaking after all of the effort, injury and inconvenience. Aligning the coupling and faucet for proper cooperation of the threads is also tedious and provoking at times.

Applicant's invention is designed to eliminate all of the difficulties inherent in the conventional coupling between a garden hose and faucet by dispensing with the use of the threads on the faucet and providing an attachment which is permanently connected to the hose and simply slipped onto the outlet end of the faucet and secured and sealed to provide a leak-proof connection through operation of a single lever; the attachment being secured to the hose through the conventional hose coupling and being intended as a fixed part of the hose, not to be removed or loosened unless the hose is to be replaced. Thus the attachment can be attached to the hose under the most favorable conditions and with the ues of the most suitable tools to insure a permanent leak-proof connection.

The objects and advantages of the invention are as follows:

First, to provide an attachment for a garden hose through which the hose is quickly, easily, and positively connectable to a conventional garden faucet, and with which the threads on the outlet end of the faucet are not utilized as connecting or securing means.

Second, to provide an attachment as outlined which is attachable to the garden hose through the conventional hose coupling, as a substantially permanent part.

Third, to provide an attachment as outlined which makes a leak-proof connection with a faucet through manual operation of a single lever.

Fourth, to provide an attachment as outlined with a member having a passage for communication between a hose and a faucet and having one end threaded for cooperation with a conventional hose coupling, and a seat and resilient gasket for the other end, with lever actuated means cooperating between the member and a collar on the faucet for forcing the gasket against the end of the faucet to form a leakproof connection.

Fifth, to provide an attachment as outlined which is simple in construction and economical to manufacture.

Other objects and advantages of the invention will become apparent as the following description is read on the drawing forming a part of this specification and in which:

Fig. 1 is a sectional elevation through the invention shown as attached to a conventional garden faucet.

Fig. 2 is a front elevation of Fig. 1.

Fig. 3 is a top plan view of Fig. 2 and showing the outlet portion of a faucet, but with the lever depressed to releasing position as indicated by dotted lines in Fig. 1.

Fig. 4 is a modification of the invention in which the operation of the lever is reversed from that in Fig. 1.

Fig. 5 is a top plan view of Fig. 4.

Fig. 6 is another modification of the invention in which the yoke and toggle mechanism of Figs. 1 to 5 is replaced by a sleeve and cam arrangement.

Fig. 7 is a section taken on line 7—7 of Fig. 6.

Fig. 8 is a top plan view of Fig. 7.

The invention is illustrated in three different forms, two of which vary only in the relative positions of the lever for securing and release, that shown in Figs. 1, 2 and 3 having the lever in a raised position for securing, while in Figs. 4 and 5 the lever is depressed for securing.

The invention consists of a member 10 having an axial passage 11, and with one end threaded as at 12 for attachment to a hose 13 through the conventional coupling 14 with interposed hose washer 15, and a seat 16 formed at the other end and provided with a conventional hose washer or resilient gasket 15 to form a tight seal against the end 17 of a conventional garden faucet 18, and lever actuated means cooperating between the member and a shoulder 19 conventionally formed on the faucet and being formed by the enlarged threaded end of the faucet as indicated. The threads on the faucet are not used in connection with this invention.

In Figs. 1, 2 and 3, the upper end of the member 10 is cupped as indicated to receive the gasket 15 and the threaded end of the faucet, with the cup functioning only as a centering device to align the faucet and member passages, and this cup freely fits over the threads on the faucet, the walls 20 freely clearing the threads. In Figs. 4 and 5 the cup is open at the back as indicated at 21 so that the member can be slid horizontally onto the faucet instead of being raised into co-operation as in the previous figures, a depression being formed as indicated at 22 to keep the gasket in place.

To make the device operable it is necessary to provide means to raise the member against the underside of the faucet and force it into positive engagement so as to form a seal through compression of the gasket. This is accomplished in Figs. 1 to 5 by a yoke 23 which slides over the faucet 18 above the threaded portion and which will rest on the shoulder 19; a lever 24 having a yoke 25 spanning the yoke 23 and pivoted at the end to the yoke 23 as indicated at 26 in Figs. 1, 2 and 3, or, pivoted intermediate its length as indicated at 27 in Figs. 4 and 5, with the ends formed at right angles as indicated at 28; and a link 29 pivotally connected at one end to the member 10 as indicated at 30, and the other end pivotally connected to the yoke arm, intermediate the length of the yoke as indicated at 31 in Figs. 1, 2 and 3, or at the ends as indicated at 32 in Figs. 4 and 5.

The modification in Figs. 6, 7 and 8 differs only in the method of obtaining the necessary pressure between the gasket and the bottom of the faucet. In this modification the member 10 is a plain cylinder threaded at one end as indicated at 12 and flattened at the other end to form a seat 16 on which the gasket 15 is placed, the difference being that the member is somewhat longer and the cup is omitted from the upper end. Instead of this cupped end and the yoke 23 as provided in Figs. 1 to 5, a sleeve 33 in which the member 10 is slidable, has a slot 34 formed inwardly from the back to span the faucet above the threaded portion to form the yoke, and a larger slot 35 formed therebelow to span the threaded portion of the faucet forming a shoulder 36 to rest on the shoulder of the faucet. Pins 37 project diametrically from the member 10 through slots 38 formed through the walls of the sleeve 33, and a lever 39 having a yoke 40 spanning the sleeve 33 and terminating in cams 41 is pivoted at 42 to the sleeve 33 below the slots. Obviously a link mechanism like that in the previous illustrations could be substituted for the cam arrangement, if desired.

The operation of the invention is as follows: The hose 13 with conventional hose coupling 14 and suitable hose washer 15 is tightly secured to the threaded end 12 of the member 10. This can be done with appropriate tools to provide a perfect leak-proof connection at this point. The attachment then forms a substantially permanent part of the hose, to be removed only if the hose should deteriorate or is to be discarded.

When the hose is to be attached to the faucet, referring to Figs. 1 to 3, the lever, link and yoke mechanism is left to hang alongside the hose, the member 10 is raised to contact the bottom of the faucet, the lever is left lowered as indicated by the dotted position in Fig. 1 while the yoke 23 is slipped over the faucet above the threaded portion. The lever is then pulled up to the solid position in Fig. 1, which draws the top of the member 10 with interposed gasket 15 tightly against the underside of the faucet, following which the faucet may be turned on with the assurance that there will be no leakage at either, the attachment-faucet connection, or the attachment-hose connection. When the hose is to be detached, the lever 24 is simply moved to the dotted position in Fig. 1 and the yoke slipped off the faucet, which releases the attachment from the faucet.

As illustrated in Figs. 4 and 5, the member 10 and the yoke 23 can be slipped simultaneously onto the end of the faucet with the lever in a raised position. Pressing the lever down locks and seals the attachment to the faucet.

As illustrated in Figs. 6, 7 and 8, the lever 39 is raised, the yoke or slotted portion of the sleeve is slipped over the end of the faucet as indicated in Fig. 6, and the lever 39 depressed. The cams 41 force the pins 37 and consequently the member 10 up against the bottom of the faucet, with the shoulder 36 resting on the shoulder 19 at the top of the threads on the faucet.

I claim:

1. An attachment for quickly connecting and disconnecting a garden hose and a garden faucet having an annular shoulder formed above the outlet end comprising; a cylindrical member having an axial passage and threaded at one end to fit a conventional hose coupling and having a gasketed seat at the other end to seat against the outlet end of the faucet, a clamp member slidable on said cylindrical member and having a yoke member formed at its upper end to fit said faucet above the shoulder and engage the top of the shoulder, a lever operable to two positions and operatively associated with said clamp member and having an aperture connection with said cylindrical member, with said lever forcing said gasketed seat against said outlet with said yoke engaging said shoulder when in one position, and releasing the attachment for removal from the faucet when in the other position, and said yoke being semi-circular at one end to fit against the side of the faucet and functioning as means for aligning said gasketed seat and the outlet of the faucet.

2. A quick attachable and detachable faucet connection comprising; a body having an axial bore and terminating in a gasket seat at one end, and a gasket for said seat, said body being threaded at the other end for releasable connection to a hose coupling; a sleeve slidable on said body and having a yoke formed diametrically at one end and extending above said gasket to engage the annular shoulder on a garden faucet and open on one side for transverse sliding to position on the faucet; and an operative connection between said body and said sleeve and including a lever operable to two positions in one of which said yoke engages said shoulder and said gasket is forced against the outlet end of the faucet, and in the other of which the attachment is released for removal from the faucet.

3. A structure as defined in claim 2; said operative connection consisting of an elongated slot formed through each side of said sleeve in diametric relation, and a pin fixed in each side of siad body and operating through said slots to permit limited relative axial movement between said body and said sleeve; and a lever pivotally mounted on said sleeve and operatively associated with said pins to force said one end of said body and said yoke toward each other and release them when said lever is in respective positions.

4. A structure as defined in claim 2; said operative connection consisting of an elongated slot formed diametrically through said sleeve; a pin fixed in each side of said body and extending through the slots in the respective sides of said sleeve; a yoke type lever spanning said sleeve and pivoted thereto and having a cam formed on each side to engage the respective pins to force said one end of said body toward the yoke on said sleeve when in one position, and to release the body and sleeve to open when in the other position.

5. A quick attachable and detachable faucet connection comprising; a body having an axial bore and terminating at one end in a gasket seat, and threaded at the other end for releasable attachment to a hose coupling, and a gasket for said seat, and having a pin projecting from each side in diametric relation; a sleeve slidable on said body and having elongated slots with said pins passing therethrough for relative limited axial movement of said body and said sleeve and extending beyond the exterior of the sleeve; a transverse slot formed in the upper end of said sleeve and terminating in a semi-circular closed end of less diameter than said body to form an inwardly projecting flange to engage the shoulder on a faucet; and a lever spanning said sleeve and having an operative connection for cooperation with said pins to force said body toward said inwardly projecting flange to clamp said gasket against the outlet of the faucet when the lever is in one position, and to release the attachment for removal from the faucet when the lever is in the other position.

6. A quick attachable and detachable connection for faucets having a shoulder near the outlet end, comprising; a body having an axial passage and terminating in a gasket seat at one end, and a gasket for said seat, and threaded at the other end for attachment of a hose coupling, and having a pin projecting from opposite sides in axial alignment; a sleeve having a bore slidably fitting said body and terminating at one end in a bore of less diameter than said seat and slotted out on one side, to form an inwardly projecting flange to fit about one side of and rest on the shoulder on the faucet, and with the sleeve slotted out below said flange to pass over the shoulder for transverse placement of the sleeve over the end of the faucet; a lever having a pair of arms spanning said sleeve and pivoted to the respective sides and having a cam formed on each arm for engagement with the respective pins, whereby, when said lever is moved to one position, the cams act through the pins to force said gasket against the bottom of the faucet through reaction of said flange against the top surface of said shoulder, and when moved to the other position the pins are released to free the attachment for removal from the faucet.

EMERSON B. BIRD.